United States Patent [19]

Landis

[11] 4,190,622
[45] Feb. 26, 1980

[54] PROCESS FOR PRILLING UREA

[75] Inventor: Norris J. Landis, Cleveland Heights, Ohio

[73] Assignee: Standard Oil Company (Ohio), Ohio

[21] Appl. No.: 903,648

[22] Filed: May 4, 1978

[51] Int. Cl.² .................. B22D 23/08; C05C 9/00
[52] U.S. Cl. .................... 264/14; 264/DIG. 51; 71/64 DB; 71/28
[58] Field of Search .............. 71/28, 64 DB, 58; 261/115, 116, 117; 34/10, 13, 57 A; 264/13, 14, DIG. 51, 5; 425/6

[56] References Cited
U.S. PATENT DOCUMENTS

| | | | |
|---|---|---|---|
| 496,768 | 10/1953 | Oholm | 34/13 |
| 3,059,280 | 10/1962 | Laehder | 71/64 DB |
| 3,539,326 | 3/1967 | Otsuka | 71/28 |
| 3,795,504 | 9/1972 | Wengeler | 71/64 DB |

Primary Examiner—Joseph Scovronek
Assistant Examiner—Chris Konkol
Attorney, Agent, or Firm—David J. Untener; Herbert D. Knudsen; Larry W. Evans

[57] ABSTRACT

Urea prills are obtained by contacting molten urea droplets with a co-current gas stream in a prill tower and cooling and collecting the prills thus formed in a fluidized bed having a second gas stream flowing countercurrent to the prills.

8 Claims, 1 Drawing Figure

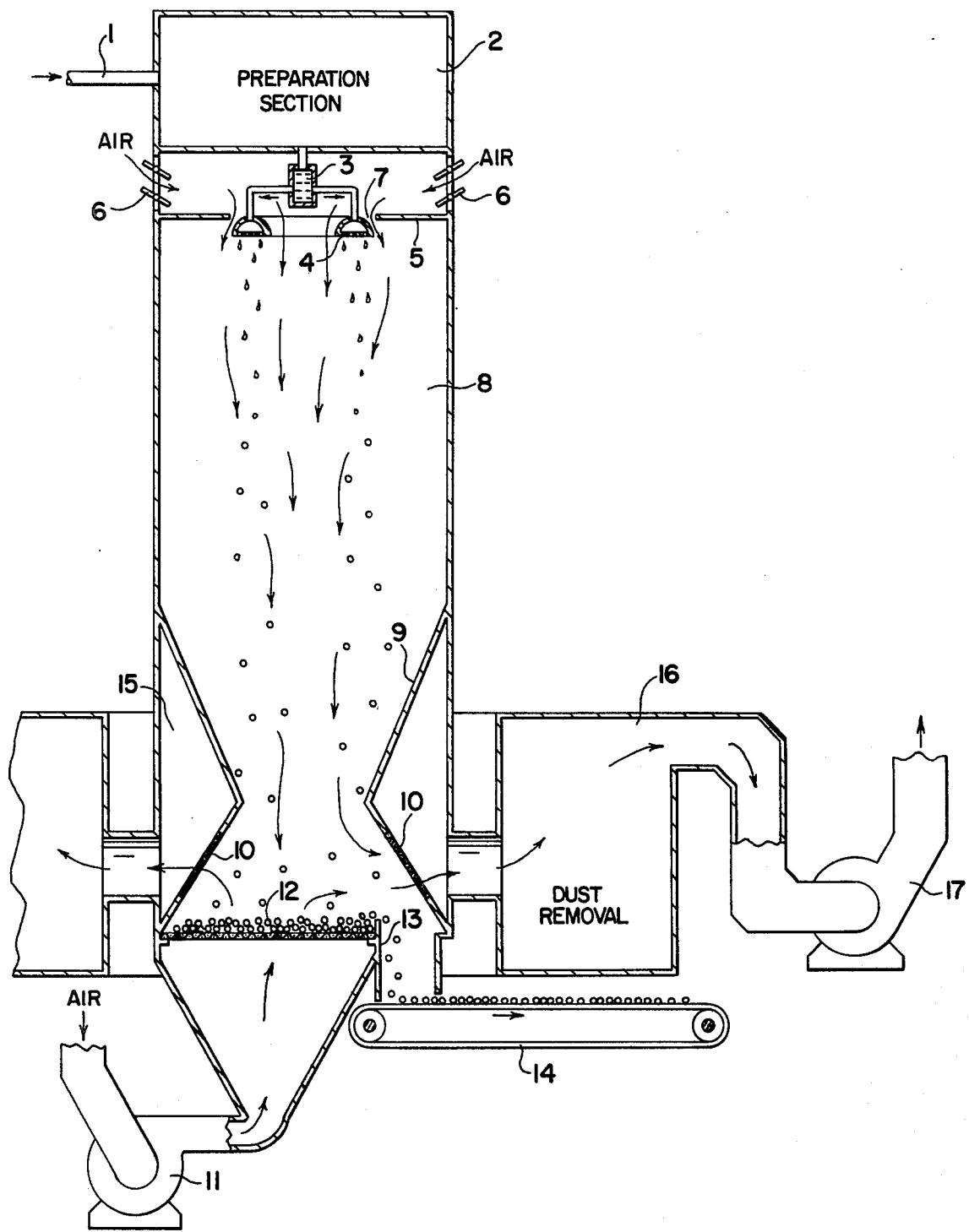

PROCESS FOR PRILLING UREA

BACKGROUND OF THE INVENTION

The manufacture of urea prills in a prill tower is a well known process. Typically, molten urea is sprayed through nozzles located at the top of the tower. The molten droplets fall down the tower while being contacted counter-currently with a gas stream, usually air. The airstream provides a cooling effect that solidifies the urea droplets into spherical form. The urea prill is then collected at the bottom of the tower.

Urea prills are manufactured in various sizes, such as feed-grade prills which have particle sizes below U.S. 20 mesh in diameter and the larger fertilizer and forest-grade prills. Depending upon the size of the prills and the temperature and humidity of the gas stream, the prill may not completely solidify as it falls through the tower. U.S. Pat. No. 3,533,776 and U.S. Pat. No. 3,334,160 describe prilling towers having a fluidized bed located at the bottom of the tower to further provide cooling and completely solidfy the urea prill.

The use of upflowing air countercurrent to the prill is thought to provide optimum cooling. This method of prilling, however, presents serious dust collection problems. The air, carrying with it the dust generated from prilling, exits the top of the prilling tower. It is both expensive and difficult to design and maintain large dust collection systems at the top of such towers. It has been necessary for some prilling operations to actually decrease the design rate in order to reduce dust emissions from such prilling operations.

One effort to reduce the dust problems associated with prilling can be found in U.S. Pat. No. 3,059,280. This patent discloses a method of prilling urea in a co-current stream of air that allows treatment of the dust-laden air at ground level. A major problem with this invention, however, is that co-current air reduces the residence time of the falling urea particle and thus the particle may not be completely solidified by the time it reaches the bottom of the tower. With larger particles, only the outside surface may be solid, having a molten core. This type of prill will disintegrate and generate even more dust when hitting the bottom of the tower for collection.

The present invention eliminates the cost and mechanical disadvantages of treating the dust-laden air at the top of the tower and provides a means for using co-current air for making all sizes of urea prills by utilizing both co-current and countercurrent airflow in a single prill tower.

SUMMARY OF THE INVENTION

A process for prilling a material wherein droplets of molten material fall through a first zone and are contacted co-currently with a first gas stream and at least partially solidifying said material thereby forming a prill, and cooling and collecting said prills in a second zone comprising a fluid bed, said bed being maintained by a second gas stream flowing countercurrent to the first airstream.

The gas stream can be any gas that is compatible with the material being prilled. The preferred and most often used gas is air. Other gases such as nitrogen and carbon dioxide may also be used.

The advantages of the present invention over the prior art are many. First, the use of co-current airflow to provide the initial cooling allows collection of the dust-laden air at the bottom of the prill tower. This greatly simplifies the design and equipment necessary to clean this airstream to acceptable environmental standards. Further, it also maintains safe working conditions at the top of the tower where operator attention and maintenance are frequently necessary.

The use of a fluidized bed utilizing upflowing or countercurrent air greatly cushions the falling urea particle and allows sufficient residence time to completely solidify any size urea prill. Thus the present invention provides a unique means for manufacturing any size urea prill, reducing the amount of dust emissions from prilling operations and collecting and treating the dust-laden air at ground level.

The invention is applicable to any material that is prilled in a prilling tower and that will at least partially solidify upon contact with a gas stream. Such materials are usually fertilizers such as urea, ammonium nitrate, ammonia phosphate, potassium chloride, potassium phosphate or potassium nitrate. The preferred use of the invention is for prilling urea.

The invention can further be understood with respect to the drawing.

DESCRIPTION OF THE DRAWING

The FIGURE is a schematic drawing showing a prill tower utilizing the present invention.

The material to be prilled is supplied to the prilling tower through conduit 1 to preparation section 2. The urea solution from a urea plant can be treated in several known ways prior to prilling. For example, water can be evaporated from this steam-heated urea solution under vacuum or reduced pressure before prilling. An alternate method of treating this urea solution is by crystallization. The solution is fed to a vacuum crystallizer wherein water vapor is evaporated from the solution. Urea crystals are separated from the crystallizer slurry, dried and elevated to the top of the prilling tower to the preparation section 2. Utilizing this method, the preparation section would include a crystal melter to remelt the crystals prior to spraying.

The preparation section is located above the prilling distributor which comprises a supply tank 3 and spray heads 4. The remelted urea crystals for example, enter supply tank 3 and are then sprayed through nozzles 4 into prilling zone 8.

A solid floor 5, is located just above the level of the spray heads. This floor allows the operating personnel access to the spray heads and associated facilities. Floor 5 further serves as a distributing baffle for part of the entering air, as will be discussed.

An induced draft fan 17, located at the bottom of the prilling tower, pulls air from the ambient atmosphere through louvers 6 into the prill tower. In almost all current practice, air is used as the coolant for prilling. The top-entering air flows across the spray head floor 5 and passes through floor openings 7 adjacent to the spray heads. The air contacts the spray-molten material at once and rises in temperature as it removes heat from the droplets of melt, causing them to solidify and cool in the prilling zone 8. The temperature of the air will tend to approach the temperature of the prills as they fall through the collector section 9. From the collector section, the prills continue downward and are collected on an air-fluidized bed 12. The warm air flowing downward from the collector section exits via screens 10 located above and peripherally to the air-fluidized bed 12.

Fluidized blower 11 brings in ambient air and causes it to pass upward through the screen of the fluidized bed 12. In this way the collected prills are cushioned as they fall and cool to their final temperature before leaving the fluidized bed.

The cooled and solidified prills pass from the fluidized bed into overflow chute 13 and conveyer 14.

The countercurrent air flowing upward through the fluidized bed 12 joins the cocurrent air from the prilling zone collector section 9 and flows out through screens 10. Both the up flowing and downflowing air masses will normally contain entrained dust, some of which leaves with the air through screens 10.

The dust-laden air passes through the screens into a plenum chamber 15 which serves as a mixing zone ahead of one or more dust removal units 16. These dust removal units may be of any of a known variety of designs, the exact choice being dependent upon the airflow size and the amount of dust contained in the stream.

The cleaned air leaves the dust removal unit 16 and enters the induced-draft air blower 17 which provides the power necessary to pull the co-current air through the prilling tower.

As can be seen with respect to the drawing, the invention is unique in that it provides a prilling system utilizing both co-current and countercurrent airflow.

The size of the prill tower is dependent upon the material being prilled. For example, a tower for prilling urea is typically about 50 meters in free-fall height.

The amount of air necessary for the cocurrent flow also depends upon the material being prilled and is well known in the art.

The fluidized bed located at the bottom of the tower consists of urea particles in turbulent motion due to the upflowing air. The turbulence of the bed gives the impression of a fluid state and hence the term fluidized bed. The fluidized bed, due to the mixing effect, provides optimum cooling contact with the upflowing air.

The present invention contemplates the use of an air distributor grid that contains openings smaller than the particle prilled to allow air to flow through the grid and fluidize the particles located above it.

The present invention thus allows the use of co-current airflow for any size particle to be prilled without the attendent disintegration of partially solidified particles at the bottom of the tower. Further, the air used for prilling, by exiting at the bottom of the tower, greatly reduces the cost and complexity of dust removal systems to clean the air to acceptable environmental standards.

I claim:

1. A process for prilling a material in a tower wherein droplets of molten material fall through a first zone and are contacted co-currently with a first gas stream and at least partially solidifying said material thereby forming a prill, and cooling and collecting said prills in a second zone comprising a fluid bed, said bed being maintained by a second gas stream flowing countercurrent to the first gas stream, wherein both first and second gas stream exit near the bottom of the tower.

2. The process of claim 1 wherein the first gas stream is air.

3. The process of claim 1 wherein the second gas stream is air.

4. The process of claim 2 wherein the second gas stream is air.

5. The process of claim 4 wherein the material is urea.

6. The process of claim 4 wherein the material is ammonium nitrate.

7. The process of claim 4 wherein the co-current and countercurrent airstreams are combined prior to exiting the prill tower.

8. The process of claim 4 wherein the combined airstreams pass through a dust collection system wherein dust is removed from the air.

* * * * *